(12) United States Patent  
Bloemers et al.

(10) Patent No.: US 6,457,721 B1
(45) Date of Patent: Oct. 1, 2002

(54) PISTON RING LOCATOR

(75) Inventors: James L Bloemers; Larry Hugg; Elmer R Ford, all of Texarkana, TX (US)

(73) Assignee: White Consolidated Industries, Inc., Cleveland, OH (US)

( * ) Notice: Subject to any disclaimer, the term of this patent is extended or adjusted under 35 U.S.C. 154(b) by 0 days.

(21) Appl. No.: 09/770,813

(22) Filed: Jan. 26, 2001

(51) Int. Cl.[7] .................................................. F16J 9/24
(52) U.S. Cl. ...................................................... 277/445
(58) Field of Search ................................. 277/445, 446

(56) References Cited

U.S. PATENT DOCUMENTS

| | | | |
|---|---|---|---|
| 890,103 A | * | 6/1908 | Sullivan ........................ 277/445 |
| 1,767,164 A | * | 6/1930 | Ahern et al. ................... 277/445 |
| 2,117,986 A | * | 5/1938 | Robertson ..................... 277/446 |
| 2,192,926 A | | 3/1940 | Meyer |
| 2,278,019 A | * | 3/1942 | Phillips ........................ 277/440 |
| 2,428,177 A | | 9/1947 | Phillips |
| 2,465,415 A | | 3/1949 | Aragones |
| 2,481,552 A | | 9/1949 | Williams |
| 2,481,553 A | | 9/1949 | Williams |
| 2,532,180 A | | 11/1950 | Moore |
| 2,554,400 A | * | 5/1951 | Butt .............................. 277/445 |
| 2,767,038 A | | 10/1956 | Brown |
| 3,105,695 A | | 10/1963 | Burns et al. |
| 3,184,245 A | | 5/1965 | Woolcott |
| 3,346,252 A | | 10/1967 | Saylor |
| 3,656,768 A | | 4/1972 | Josephian |
| 4,213,427 A | | 7/1980 | Di Stefano |
| 4,256,067 A | | 3/1981 | Fukui |
| 4,358,121 A | | 11/1982 | Sand |
| 4,367,702 A | | 1/1983 | Lassanske |
| 4,572,520 A | * | 2/1986 | Shinada ........................ 277/446 |
| 4,883,029 A | | 11/1989 | Winston |
| 4,962,691 A | | 10/1990 | Kanao |
| 4,966,068 A | | 10/1990 | Ficht et al. |
| 5,117,742 A | | 6/1992 | Iida |
| 5,203,294 A | | 4/1993 | Takemura et al. |
| 5,664,536 A | | 9/1997 | Bigsby |
| 5,996,545 A | | 12/1999 | Kling |

* cited by examiner

Primary Examiner—Anthony Knight
Assistant Examiner—John L. Beres
(74) Attorney, Agent, or Firm—Pearne & Gordon LLP

(57) ABSTRACT

A piston and split piston ring assembly having a piston ring locator to prevent substantial rotation of the piston ring in a ring groove. A notch is provided in a wall of the ring groove and an abutment pocket is formed by the ends of the split piston ring. The piston ring locator is a flattened wire clip within the groove between the piston ring and the wall of the groove. A segment of the clip is displaced into the notch and another segment is displaced into the pocket.

9 Claims, 2 Drawing Sheets

PISTON RING LOCATOR

BACKGROUND OF THE INVENTION

This invention relates to piston ring locators which are intended to position a split piston ring so that the ring will not rotate in the groove during operation of the engine.

It is important, particularly in two-stroke internal combustion engines, to prevent the split piston ring from rotating to a radial position where the ends of the ring are exposed to the exhaust port or the transfer port. Such exposure permits one or both of the ring ends to expand radially outwardly into the port and to be broken off or jammed as the piston is driven from the port.

A variety of techniques have been proposed to position the ends of the split ring in a predetermined radial position on the piston so that the ends will clear the exhaust and transfer ports. One such arrangement is disclosed in U.S. Pat. No. 5,664,536 to Bigsby. In that patent, the piston ring groove is machined so that a recess extends radially inward from a portion of the groove. A split piston ring is located in the groove and the ring is provided with a tab which extends radially inward and is received within the recess, thereby preventing rotation of the ring relative to the piston.

Other piston ring locating techniques are demonstrated in U.S. Pat. Nos. 2,481,552 and 2,481,553 to Williams. Both of these patents provide an annular channel machined into the piston ring groove. A wire locking clip is placed in the channel so that it is located inwardly of the piston ring. In both patents, one end of the wire clip is bent radially outwardly and cooperates with a hole drilled through the ends of the split piston ring. The piston ring is anchored in position according to the teachings of the '552 patent by frictional engagement of the wire within the channel. The piston is anchored in position according to the teachings of the '553 patent by an in-turned end portion of the wire which comprises an anchoring stud. The anchoring stud is received in a hole drilled radially into the piston.

A common technique for locking a split piston ring against rotation is to drill and ream a small hole radially into the bottom of the piston ring groove. A steel pin is press fitted into the hole. An abutment pocket is formed at the ends of the split piston ring and the pin is received in the pocket to prevent rotation of the ring.

These prior art techniques add to the cost of the piston because of the additional precision machining operations on the piston and/or piston ring. Further, stop pins embedded in the piston tend to loosen or break during prolonged operation.

SUMMARY OF THE INVENTION

This invention overcomes many of these prior art problems by providing a piston and piston ring assembly having a low-cost piston ring locator which is reliable and which does not require costly modifications to the piston and/or piston ring.

According to the invention, the assembly includes a piston having a circumferential piston ring groove defined by an axially extending circumferential bottom wall and spaced radially extending annular sidewalls. A split piston ring is located in the groove together with a piston ring locator. The locator is a flattened steel wire in the form of a ring-shaped clip having an annular body portion and first and second end portions. The clip is sandwiched between the piston ring and one of the groove sidewalls. A first segment of the clip is displaced and extends substantially in a first axial direction. A second segment of the clip is displaced and extends substantially in a second axial direction. A notch is provided in one of the groove sidewalls and extends in one of the axial directions and the ends of the split ring form an abutment pocket extending in another one of the axial directions. The first segment of the clip is received in the notch and the second segment of the clip is received in the abutment pocket to thereby lock the ring against any substantial movement relative to the piston.

According to one aspect of this invention, the first segment of the clip is the first of the end portions and the second segment of the clip is in the annular body portion.

According to a further aspect of this invention, the first segment of the clip is the first of the end portions and the second segment of the clip is the second of the end portions.

According to another aspect of this invention, the first segment of the clip is in the annular body portion and the second segment of the clip is in the annular body portion.

According to a still further aspect of this invention, the first segment of the clip is in the annular body portion and the second segment of the clip is the second of the end portions.

It will become apparent that this invention does not involve precision machining or forming operations on the piston and/or the piston ring, nor the placement of a stud or pin in the piston to restrain rotation of the ring.

DETAILED DESCRIPTION OF THE INVENTION

Figure 1:
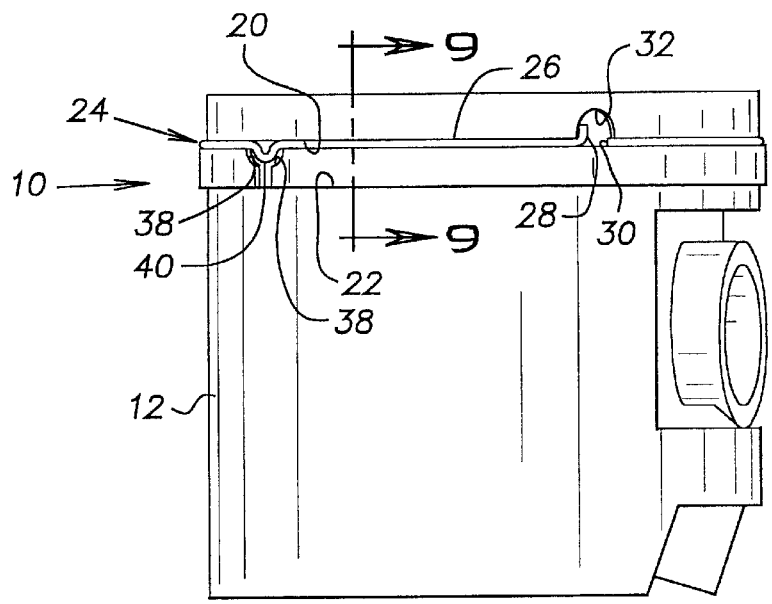
FIG. 1 is an elevational view of a piston and piston ring assembly according to this invention.
Figure 3:
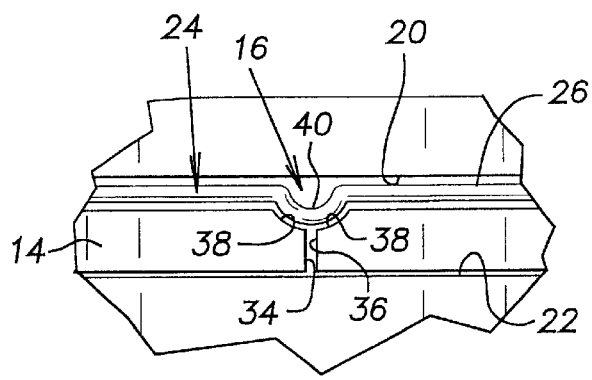
FIG. 3 is an enlarged fragmentary portion of the assembly shown in FIG. 1.
Figure 2:
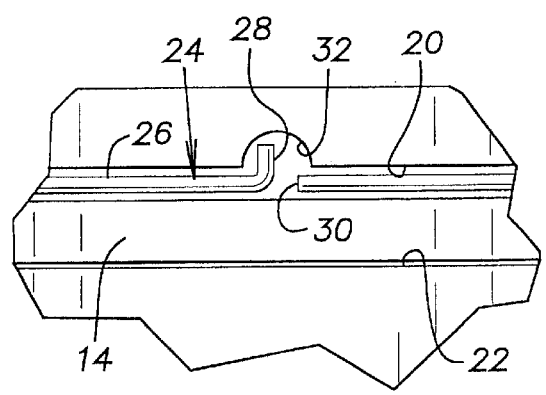
FIG. 2 is an enlarged fragmentary portion of the assembly shown in FIG. 1.
Figure 9:
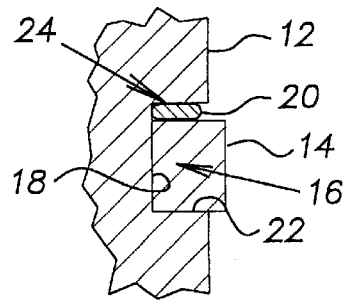
FIG. 9 is a sectional view, the plane of the section being indicated by the line 9—9 in FIG. 1.

Referring now to the drawings, and particularly, to FIGS. 1–3, there is illustrated a piston and piston ring assembly 10 for an internal combustion engine. The assembly 10 includes a piston 12 having a circumferential split piston ring 14 located in a circumferential piston ring groove 16. As may be seen most clearly in FIG. 9, the ring groove 16 is defined by an axially extending circumferential bottom wall 18 and spaced radially extending annular sidewalls 20 and 22.

A piston ring locator 24 is positioned in the groove 16 between the piston ring 14 and the annular sidewall 20. The locator 24 is a flattened ring-shaped clip having an annular body portion 26 and first and second end portions 28 and 30. A notch 32 is formed in the sidewall 20 and extends in a first axial direction. The split ring has ends 34 and 36 (FIG. 3) which are formed to provide a pocket 38 extending in a second axial direction.

A first segment of the ring locator 24 is displaced and extends in the first axial direction and a second segment of the ring locator 24 is displaced and extends in the substantially opposite second axial direction. In the embodiment shown in FIGS. 1–3, the first end portion 28 comprises the first segment of the ring locator 24 and it is displaced upwardly into the notch 32 while a portion 40 of the annular body portion 26 is displaced downwardly into the pocket 38 to comprise the second segment of the ring locator 24.

The position of the notch 32 and the arcuate extent of the body portion 26 between the displaced portion 40 and the displaced first end portion 28 determines a substantially fixed location for the split ends 34 and 36 of the piston ring 14. This position is selected so that the ring ends 34 and 36 are located in a radial position on the piston that is adapted to clear the exhaust and transfer ports.

Figure 4:
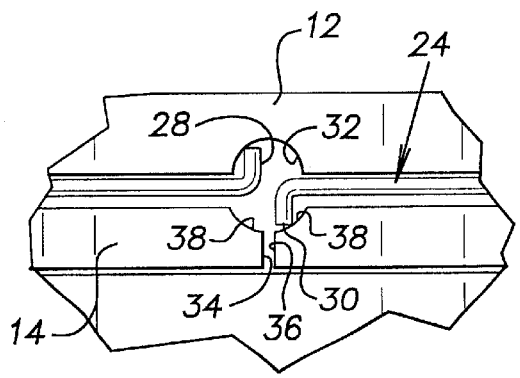
FIG. 4 is an enlarged fragmentary portion of a piston and piston ring assembly according to another aspect of this invention.

A piston and piston ring assembly according to a further aspect of this invention is illustrated in FIG. 4. A first segment of the ring locator 24 is displaced and extends in the first axial direction and a second segment of the ring locator 24 is displaced and extends in the substantially opposite second direction. According to this aspect of the invention, the first end portion 28 comprises the first segment of the ring locator 24 and is displaced upwardly into the notch 32. The second end portion 30 comprises the second segment of the ring locator 24 and is displaced downwardly into the pocket 38.

Figure 5:
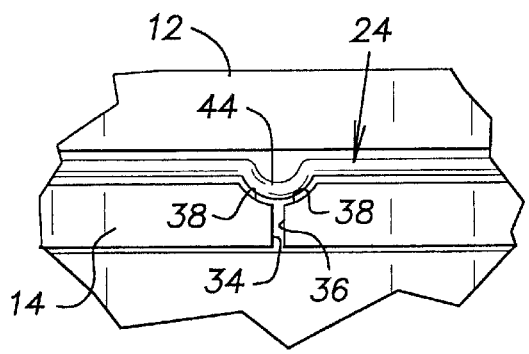
FIG. 5 is an enlarged fragmentary portion of a piston and piston ring according to another aspect of this invention.
Figure 6:
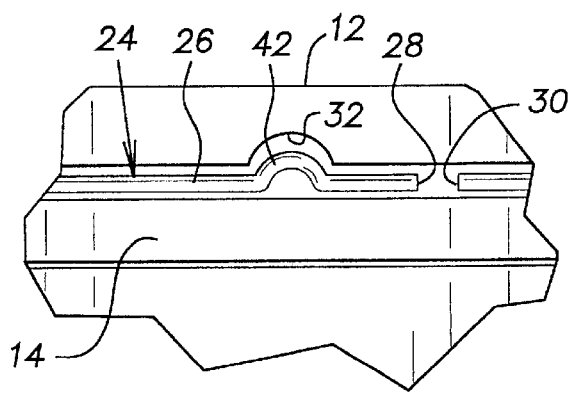
FIG. 6 is an enlarged fragmentary portion of the piston and piston ring assembly as shown in FIG. 5.

A piston and piston ring assembly according to another aspect of this invention is illustrated in FIGS. 5 and 6. A first segment of the ring locator 24 is displaced and extends in the first axial direction and a second segment of the ring locator 24 is displaced and extends in the substantially opposite second direction. According to this aspect of the invention, a portion 42 of the annular body portion 26 is displaced upwardly into the notch 32 to comprise the first segment of the ring locator, while another portion 44 of the annular body portion is displaced downwardly into the pocket 38 to comprise the second segment of the ring locator 24.

Figure 7:
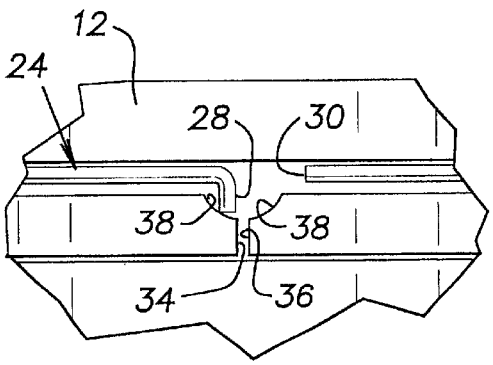
FIG. 7 is an enlarged fragmentary portion of a piston and piston ring assembly according to a still further aspect of this invention.
Figure 8:
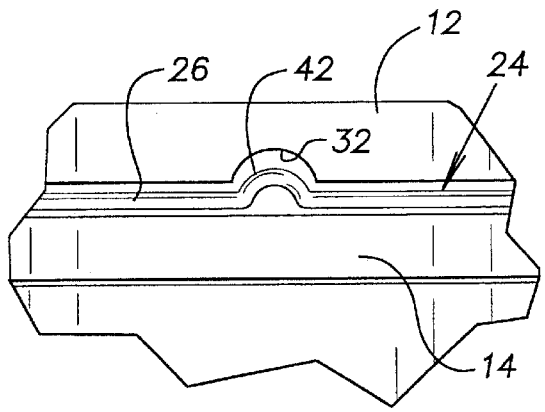
FIG. 8 is an enlarged fragmentary portion of the piston and piston ring assembly as shown in FIG. 7.

A piston and piston ring assembly according to a still further aspect of this invention is illustrated in FIGS. 7 and 8. A first segment of the ring locator 24 is displaced and extends in a first axial direction and a second segment of the ring locator 24 is displaced and extends in the substantially opposite second direction. According to this aspect of the invention, a portion 42 of the annular body portion 26 is displaced upwardly into the notch 32 to comprise the first segment of the ring locator 24 while the first end portion 28 is displaced downwardly into the pocket 38 to comprise the second segment of the ring locator 24.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A piston and piston ring assembly for an internal combustion engine including a piston ring locator to prevent substantial rotation of the piston ring in a ring groove comprising a piston having a circumferential piston ring groove defined by an axially extending circumferential bottom wall and spaced radially extending annular sidewalls, a split piston ring in said groove having facing ends at said split, a piston ring locator in said groove, said locator comprising a ring-shaped clip having an annular body portion and first and second end portions, a first segment of said clip being displaced and extending substantially in a first axial direction, a second segment of said clip being displaced and extending in a substantially opposite second axial direction, a notch in one of said sidewalls extending in one of said directions, and at least one of the facing ends of said split piston ring defining an abutment pocket extending in another one of said directions, said first segment of said clip being received in said notch and said second segment of said clip being received in said abutment pocket to thereby lock said ring against any substantial rotational movement relative to said piston.

2. A piston and piston ring assembly according to claim 1 wherein said first segment of said clip is the first of said end portions.

3. A piston and piston ring assembly according to claim 1, wherein said first segment of said clip is in said annular body portion.

4. A piston according to claim 2 wherein said second segment of said clip is the second of said end portions.

5. A piston and piston ring assembly according to claim 2 wherein said second segment of said clip is in said annular body portion.

6. A piston and piston ring assembly according to claim 3 wherein said second segment of said clip is the first of said end portions.

7. A piston and piston ring assembly according to claim 3 wherein said second segment of said clip is in said annular body portion.

8. A piston and piston ring assembly according to claim 1 wherein another end of said split piston ring cooperates with said at least one end of said piston ring to define said abutment pocket.

9. A piston and piston ring assembly according to claim 1 wherein said ring-shaped clip is flattened.

\* \* \* \* \*